June 6, 1939. C. SMITH Re. 21,110

ADDRESSING AND PRINTING MACHINE

Original Filed April 7, 1933 7 Sheets-Sheet 1

INVENTOR
Clyde Smith,
BY
Belt and Wallace
ATTORNEYS

ADDRESSING AND PRINTING MACHINE

Original Filed April 7, 1933 7 Sheets-Sheet 2

Inventor

Clyde Smith.

By Belt and Wallace

Attorneys

ADDRESSING AND PRINTING MACHINE

Original Filed April 7, 1933 7 Sheets-Sheet 3

INVENTOR
Clyde Smith,
BY
Bell and Wallace
ATTORNEYS

June 6, 1939. C. SMITH Re. 21,110

ADDRESSING AND PRINTING MACHINE

Original Filed April 7, 1933 7 Sheets-Sheet 4

INVENTOR
Clyde Smith,
BY
Bell and Wallace
ATTORNEYS

June 6, 1939. C. SMITH Re. 21,110
ADDRESSING AND PRINTING MACHINE
Original Filed April 7, 1933 7 Sheets-Sheet 5
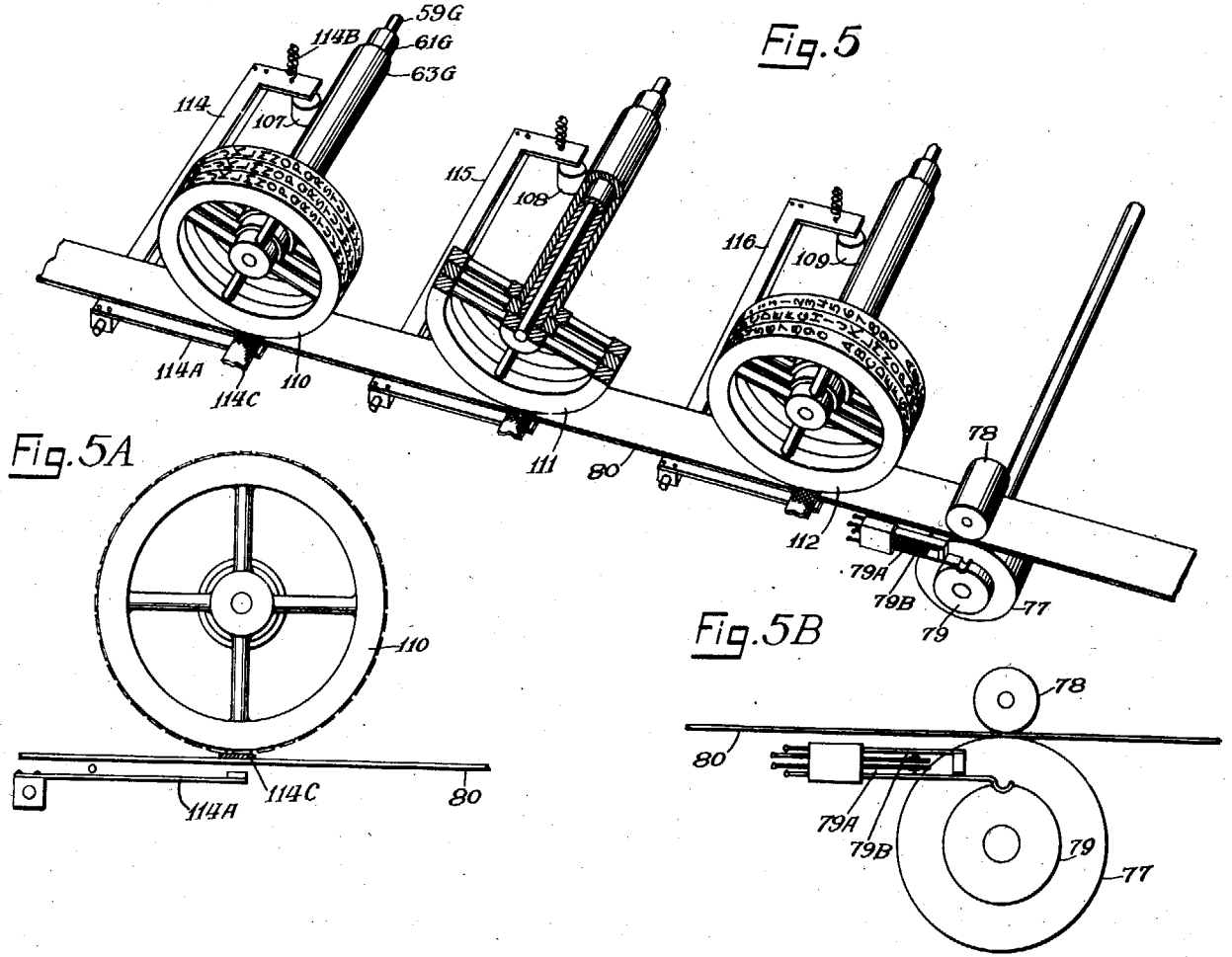
INVENTOR
Clyde Smith,
BY Best and Wallace
ATTORNEYS June 6, 1939. C. SMITH Re. 21,110
ADDRESSING AND PRINTING MACHINE
Original Filed April 7, 1933 7 Sheets-Sheet 6
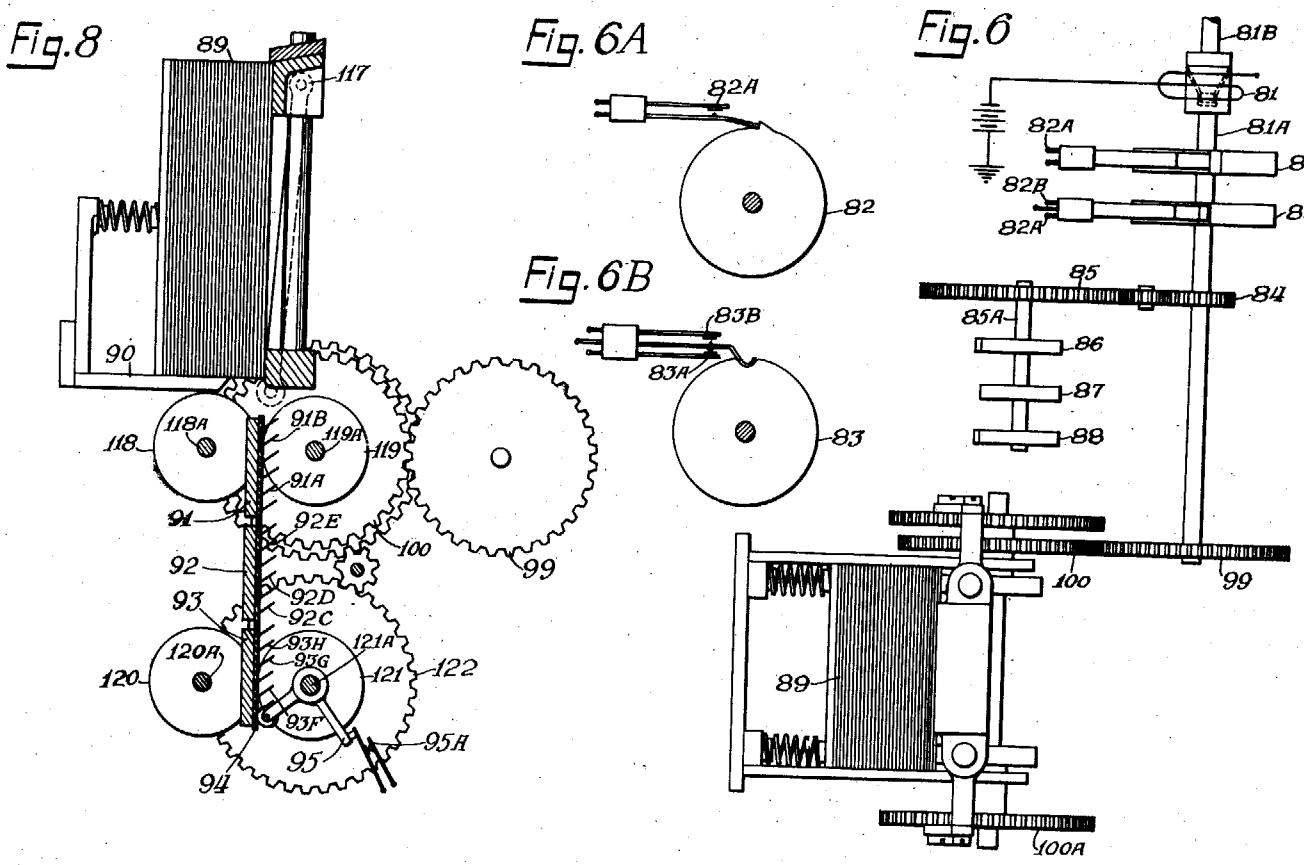
INVENTOR
Clyde Smith
BY
Pelt and Wallace
ATTORNEYS

ADDRESSING AND PRINTING MACHINE

Original Filed April 7, 1933 7 Sheets-Sheet 7

INVENTOR
Clyde Smith
BY
Belt and Wallace
ATTORNEYS

Reissued June 6, 1939

Re. 21,110

UNITED STATES PATENT OFFICE 21,110

ADDRESSING AND PRINTING MACHINE

Clyde Smith, Hopkinsville, Ky., assignor, by mesne assignments, to Addressograph-Multigraph Corporation, Cleveland, Ohio, a corporation of Delaware Original No. 2,077,963, dated April 20, 1937, Serial No. 664,951, April 7, 1933. Application for reissue April 17, 1939, Serial No. 268,406

42 Claims. (Cl. 101—58)

The kind of addressing machine to be described is one in which type wheels are selected and set under electrical control through the medium of code discs for printing a line at a time upon a succession of papers, as envelopes or bills.

This specification includes matter described and claimed in my co-pending application Ser. No. 603,582, filed April 6, 1932, and in my co-pending application Ser. No. 664,952, filed April 7, 1933. Through the improvements herein shown over the earlier application, the operation should be more rapid and adaptable to a greater variety of uses. The principal differences are in the use of type wheels instead of type bars, and the positioning of the wheels for printing by code discs. These latter are well known in the telegraph art, and are described in detail in United States Patent No. 1,821,110, issued to Morton and others for a stock ticker device.

Besides objects of the invention as set forth in the earlier application mentioned and the improvements through the use of code discs, it is an object of the invention to connect the rotating member of each set of code discs to its type wheel by means of shafts sleeved one over the other to permit axial alinement with the type wheel.

It is an object of the invention so to arrange and articulate the selectors for the code discs that the type wheels may be closely spaced for printing in a line.

It is also an object of the invention to provide for the control of the perforated cards, which are described as the means of governing the operation of code discs for type selection, in such wise that in their successive movements a given card is positioned at the beginning of type wheel selecting movement for its predecessor card, and the record of the first-mentioned card is withheld from the code discs next in order of operation until the record of the other has been printed.

The various objects of the invention are effected by the mechanisms and circuits illustrated in the accompanying drawings, in which:

Figure 1 shows three groups of register relays, which take up the record of card perforations, and in due course control the selection of type.

Figure 2 includes transfer relays, and control cams and their relays.

Figure 3 includes sundry portions of mechanisms and circuits for printing, feeding cards, advancing paper, etc.

Figure 4 includes a top plan view of nine sets of code discs, which are selectively operated from the register relays, and operate to select and position the type wheels.

Figure 5 shows in perspective three groups of type wheels, paper feed and ribbons, conventional type hammers, and their operating magnets.

Figure 5A is an end view of a type wheel, a section of paper, ribbon, and a hammer.

Figure 5B is an end view of feed and friction rolls, paper, and feed control cam and contacts.

Figure 6 is a top plan view of a conventional card feed, and associated cams, with contacts, less wiring.

Figures 6A and 6B show details of elements of Figure 6 in end view.

Figure 7:
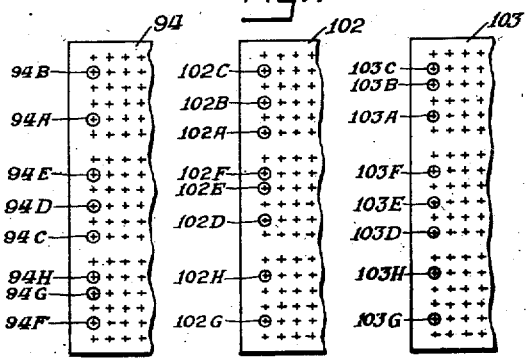

Figure 7 includes fragmentary views of cards.

Figure 8 is an end view of card feed and cards stacked for feeding.

Figure 9:
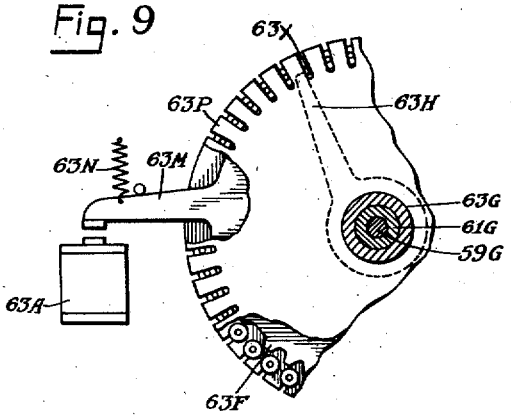

Figure 9 is a fragmentary end view of a code disc and its several parts.

Figure 10:
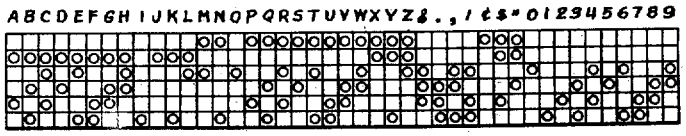

Figure 10 shows a conventional layout of the six-unit code according to which the cards are perforated.

Description of Apparatus

The electrical circuits generally are not traced under this heading but under the sub-headings of the description of operation which follows.

Figure 1:
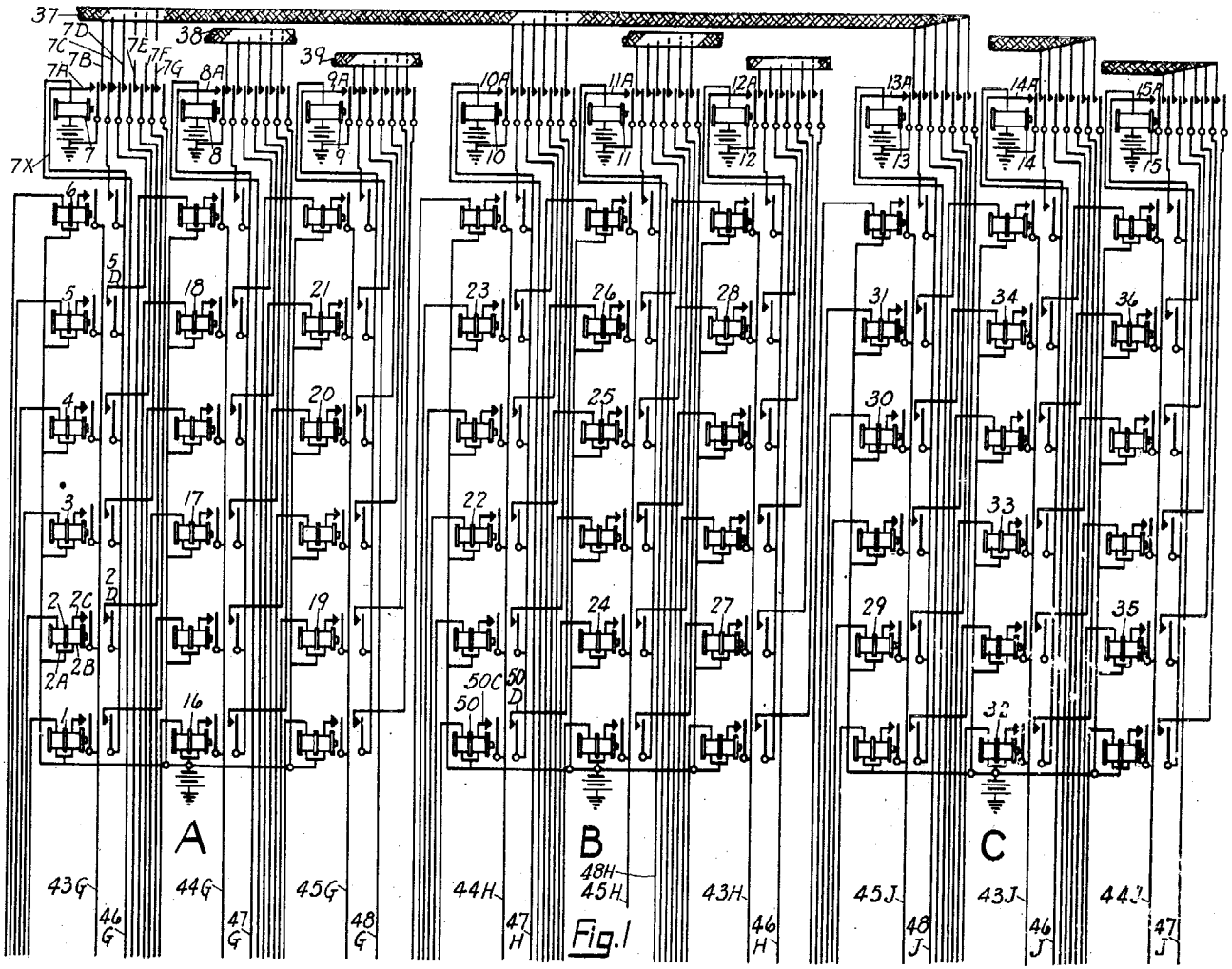

*Registers. Figure 1*

Figure 2:
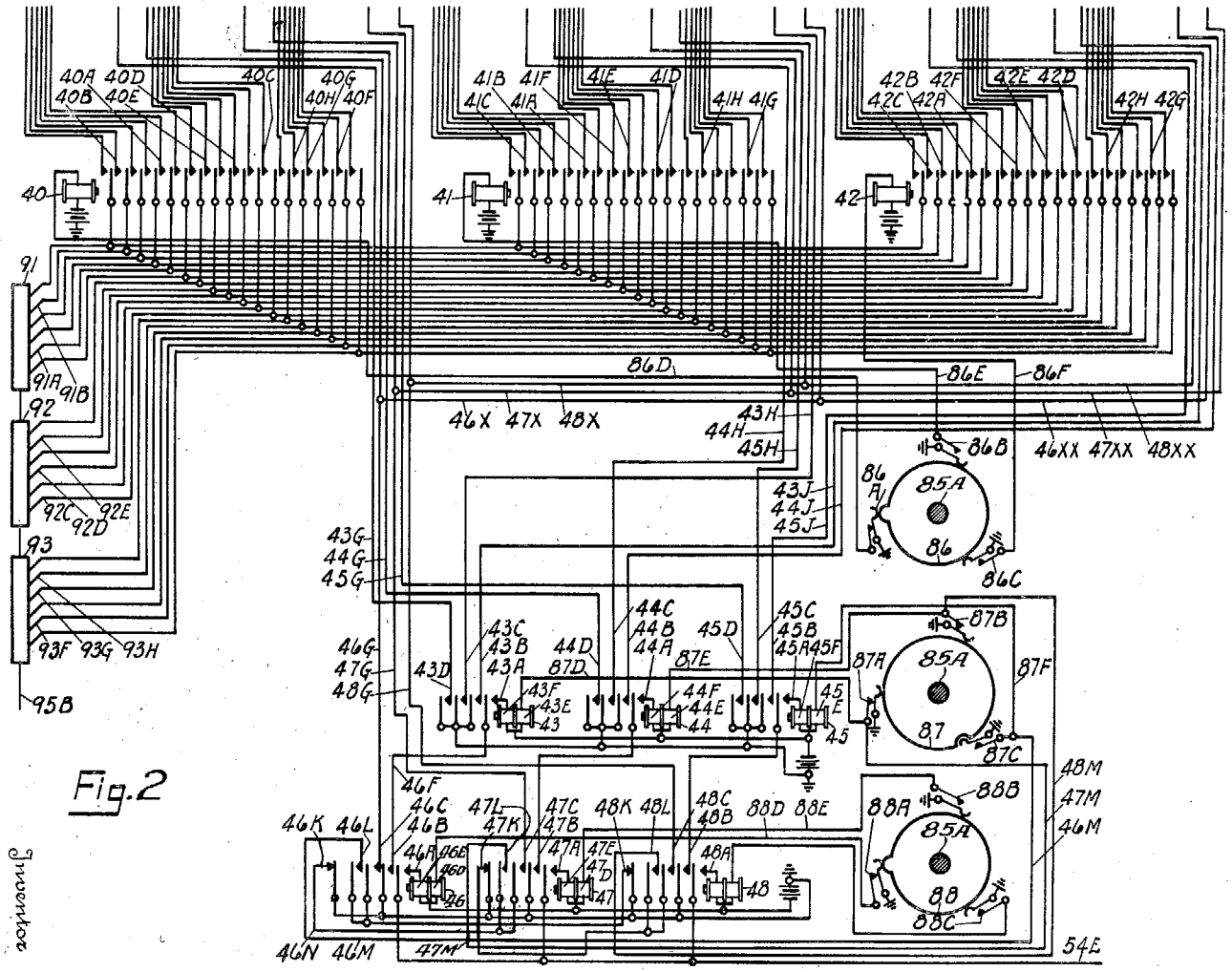

Three groups of registers are shown, A, B, and C. Each of these groups includes three rows of six register relays each, as 1, 2, 3, 4, 5, 6, and a shift relay, as 7. Common to each group is a transfer relay, as 40 (Fig. 2).

The register relays are for the purpose of taking up the record of the card perforations, as transmitted through the brushes, as 91A (Fig. 2), closed on the bars, and later transmitting the record to the printing elements. Each register group, as A, has three shift relays, as 7, 8, 9, one for each row of register relays. They are for the purpose of setting up circuits from contacts as 7A and 2D, and transferring the circuits through contacts as 7F, cable 37, cable 37 (Fig. 4), to the code disc operating magnets, as 58B. The contacts of these shift relays 7, 8, 9, are multiplied through cables 37, 38, 39, to like-positioned contacts in the B and C groups, for the purpose of making each of the printing control mechanisms, denoted generally by 59, 65, 71 (Fig. 4), common to the three rows of relays, one in each of the three groups. The cables, 37, 38, 39, are broken off at nearby points, and reappear in Figure 4, bearing like reference characters.

Relay 7 shifts the circuits from the first register relays, 1 to 6, to the number 1 printing control mechanism 59 (Fig. 4); relay 8, from the second register relays to the number 2 printing control mechanism, 65; relay 9, from the third like relays to the number 3 mechanism, 71. Like relays of the B and C register groups serve a like purpose. These relays are energized by contacts as 46C (Fig. 2), which in turn are controlled by cam wheel 88, and contact 54B of relay 54 (Fig. 3), which is deenergized on the completion of a printing operation.

Register relays, as 2, when selected through card perforations, are momentarily energized through the brushes, as 91A (Fig. 2), and the contacts, as 40A, of the transfer relay 40, and windings as 2A. Once energized, they lock up through windings as 2B, contacts as 2C, conductors as 43G, and contacts as 43D (Fig. 2); and remain energized until the record is transferred to the paper through the printing process. Each register relay, as 2, has a contact, as 2D, for the purpose of setting up circuits from contacts as 7A through contacts as 7F of the shift relay, as 7, to the printing control mechanism, as will be described.

For the purpose of this description, only three rows of relays in each group are shown—a row for each type wheel that may print a character in the address. Each row (and each illustrated character) for this purpose represents a line of print. In practice, there would be as many such rows in each group as the number of type spaces in a line. A single row may be termed a "character register"; a plurality of rows (or, as here illustrated, a single row) representing a line, a "line register". Each of the three groups illustrated includes three such line registers.

The selected relays in the three rows of the selected group are energized at the same time from brushes as 91A (Fig. 2), and through contacts of a transfer relay, as 40, as before stated, and are deenergized one row at a time as the character or line is printed.

For the purpose of this description, it is assumed that the register relays of the A group are the first to energize, at the start of operations; those of the B group, second; and those of the C group, third. They deenergize in each group in the order of the rows.

The relays of the A group energize and transfer the record of the first register to the first printing control mechanism, 59A to 59F, at D (Fig. 4), for the top line of the first paper, or the first portion of a continuous roll of paper, for a run, say, of checks or bills, to be later cut off. Next, the relays of the B group energize and transfer the record of the first register to the first printing control mechanism for the top line of the second paper; at the same time, the second register of the A group transfers its record to the second printing control mechanism, 65A to 65F, at E (Fig. 4), for the middle line of the first paper.

Last in the first cycle, the relays of the C group energize and transfer the record of the first register to the first printing control mechanism, 59A to 59F, at D, for the top line of the third paper, while the third register of the A group and the second register of the B group transfer their respective records to the third printing control mechanism, 71A to 71F, at F, for the bottom line of the first paper and to the second mechanism for the middle line of the second paper.

Deenergization of each row of relays immediately follows the printing of their record. The first operation in the second cycle includes the printing of the top line of the fourth paper, the middle line of the third, and the bottom line of the second.

*Transfer relays, control cams and relays*
*Figure 2*

The transfer relays 40, 41, 42, are for connecting to their respective register groups in turn all the contact bars and brushes closed by the perforations in a card, at one time, in order that the records of the card may be transferred to respective registers for storage. Relays as 40 are energized by contacts as 86A, by cam 86, as will later be described.

In Figure 2 is a side view of the cams for controlling the several registers, the transfer and shift relays, also three sets of brushes, and a side view of the bars and brushes.

The cams, 86, 87, 88, are all mounted on the same shaft. They are shown in position for the number 1 card. They are timed to coordinate their several relays with the card feed. They move 120 degrees for each card, and control circuits to register the perforation positions on the register relays of the A, B, and C groups, with the effect of storage. The ejection of the first card and the placing of the second card follows immediately the beginning of the movement of the print control mechanism for printing the record of the first card and starts the movement of the cams to their next position.

Cam 86 is for the purpose of closing contacts 86A, 86B, 86C, which control the energization of transfer relays 40, 41, 42, in the order given, when this cam is in the position shown. Cam 87 and contacts 87A, 87B, 87C, are for the purpose of energizing, through windings as 43E, relays 43, 44, 45, on all movements, and holding energized two of the three relays, as 43 and 44, 44 and 45, 45, and 43, on completion of a movement. Cam 88 and contacts 88A, 88, 88C, are for the purpose of initially energizing, through windings as 46D, relays 46, 47, 48.

Relays 43, 44, 45, when energized are for the purpose of grounding contacts as 43D, 43C, 43B, and holding energized the selected relays of the several registers when these are once energized from the contact bars and brushes, and releasing them row by row in the order outlined below. Contact 43D, through conductor 43G, 43G (Fig. 1), holds energized, until the printing operation is completed, such of the first row of relays, 1, 2, 3, 4, 5, 6, of the A group as may have been energized. Contact 43C and conductor 43H, 43H (Fig. 1) have a like holding effect upon the third row in the B group; and contact 43B, conductor 43J, 43J (Fig. 1) upon the second row in the C group.

In a like manner, contacts 44D, 44C, 44B, hold energized the second, first, and third registers respectively of groups A, B, C; and contacts 45D, 45C, 45B, the third, second, and first registers respectively of groups A, B, C.

The three relays are alike in construction and operation, and all have the same function; each relay has two windings, as 43E and 43F; windings 43E, 44E, 45E, are energized from their respective contacts 87A, 87B, 87C, on each movement of cam 87; on the stoppage of the movement, one of the three windings, as 45E, is freed from this source of ground when the cam is positioned as shown in Figure 2; on the next movement, winding 43E is freed; and on the third movement, winding 44E. Each of the windings, as 45E, has as another source of energization conductor 46M and contact 46L so long as relay 46 is energized. This is for a purpose that will be later described.

The windings as 43F and contacts as 43A are for holding relay 43 locked after the initial energization of winding 43E; once energized, the relays at 43 are locked up by contact 46B. It will be seen from the foregoing that each relay has three sources of energization; for example, relay 45: contact 87C, conductor 87F, winding 45E; contact 46L, conductors 46M and 87F, winding 45E; contacts 45A and 48B, winding 45F. This arrangement is for the purpose of first energizing all three relays and later of momentarily deenergizing a relay, as 43, opening contacts 43D, 43C, 43B, and releasing the energized register relays, as 2 and 5 of the A group, on completion of the printing operation of the first card, and later reenergizing relays as 43 for holding energized the selected register relays, as 27 and 28 for the second card, 32, 33, 34 for the third card, and 2 and 5 for the fourth card, as the several operations proceed. The manner in which the just enumerated storage relays are selectively energized will be explained more fully hereinafter in the description of operation. For each card, one of three relays will momentarily deenergize and release the energized register relays under its control, as described in detail under an operation heading.

Relays 46, 47, 48, are for the purpose of energizing the shift relays, as 7 (Fig. 1), which set up circuits through the registers to the printing control mechanism, and for holding energized and later releasing relays 43, 44, 45. Each relay in its turn is first energized by a contact as 88A, and windings as 46D; once energized, it is held locked through windings as 46E, contacts as 46A, conductor 54E, 54E (Fig. 3), and contact 54B, and held energized until the printing operation concurrent with the sensing of the number 1, or 4, or 7, card is complete.

Contacts as 46C, through conductors as 46G, control each a shift relay, in the same order as relays 43, 44, 45, control the continued energizations of the register relays. Conductor 46G (Fig. 2), 46G (Fig. 1), leads to the first shift relay 7, of the first register in the A group. Conductor 46G is multiplied to conductors 46X (Fig. 2) and 46H (Fig. 1) to the third shift relay, 12, in the B group, and through conductors 46XX (Fig. 2) and 46J (Fig. 1) to the second shift relay, 14, in the C group. Contact 47C is wired in a like manner through conductor 47G, 47G (Fig. 1) to the second shift relay, 8, in the A group, the first shift relay, 10, in the B group, and the third shift relay, 15 in the C group. Contact 48C is wired through conductor 48G to the third shift relay, 9, in the A group, the second shift relay, 11, in the B group, and the first shift relay, 13, in the C group.

Contacts as 46K are for the purpose of making ineffective the closing of contacts as 47L and 47C until the relay, as 46, of the next higher order has deenergized. Contact 48K serves a like purpose for relay 46. This is more particularly described under the operation heading.

Energization of shift relays, as 8, from contacts as 47C, is withheld so long as relays of a lower order, as 46, remain energized, due to the movement of a type wheel registering the record, as, for example, of the first card, and the positioning of the succeeding card. With this condition, cams 86, 87, 88, reach the second position, contact 87A is open, freeing winding 43E from this source of energization. Relays 46 and 47 are both energized, contact 46B grounds conductor 46F, contact 43A, holding winding 43F energized. Relay 46 releases, contact 46B opens, releasing relay 43; contact 46K closes a measured length of time after contact 46B opens, grounding contacts 47L and 47C; contact 47L grounds conductors 47M and 87D, reenergizing relay 43. Contact 47C grounds conductor 47G, energizing shift relay 8, to transfer the record of the second card to the printing control mechanisms.

Relays as 46, when initially energized by their cam contacts, as 88A, are held energized by windings as 46E, contacts as 46A, conductor 54E, 54E (Fig. 3), and contact 54B, during the movement of cam 88 from contact 88A to 88B, or so long thereafter as is needed for the printing control mechanism to position the type wheels for the preceding card. With this arrangement, the second card is advanced at the beginning of the movement of the type wheels for printing the record of the first card, and the second card is ineffective until such printing is complete.

91, 92, 93, indicate a side view of the bars and associated brushes.

*Sundry mechanisms and circuits for printing, feeding cards, advancing paper, etc.*

Figure 3:
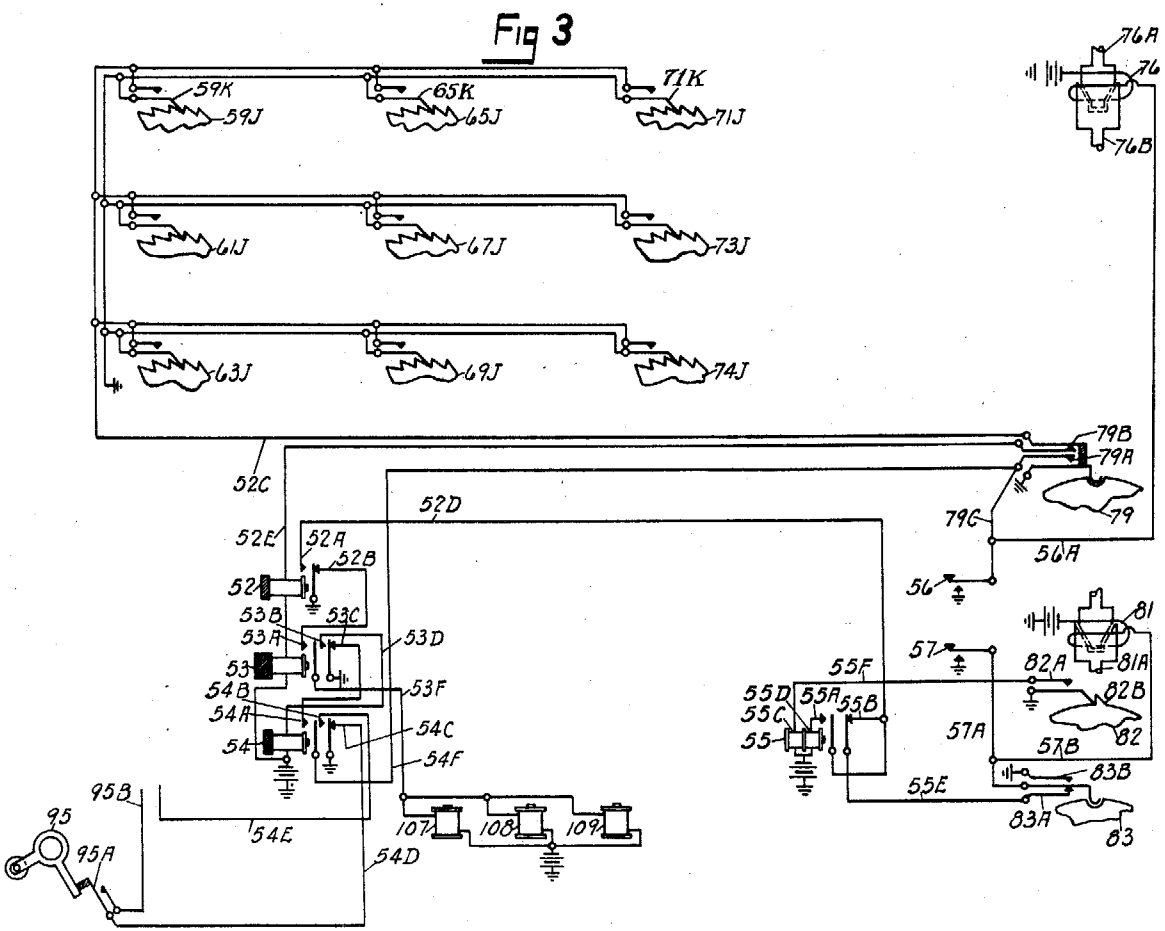

In Figure 3 are shown fragmentary side views of the toothed wheels, as 59J, of the six printing control elements (Fig. 4), and their associated contacts and wiring; the printing and card advancing control relays, 52, 53, 54; fragmentary views of the clutch 76 for advancing the paper; the paper feed control cam wheel 79; the clutch 81 for setting in motion the card feed, and its control cam, 83; the test wheel 82 and its relay 55; the printing hammer magnets, 107, 108, 109; also an end view of the rocker arm, 95, its contacts 95A, and wiring for rendering the registers ineffective and stopping the action of the card feeding mechanism when the card feed box, 90, is empty.

There is a toothed wheel, as 59J, for each type wheel; it has a tooth for each character space. The several wheels move in unison with the type wheels, and close contacts as 59K on each movement from one type space to the next. They are for the purpose of energizing relays 52, 53, 54, so long as any wheel is in selective motion.

Relays 52 and 53 are slow to release; relay 53 is the slower of the two. They are energized by contacts as 59K, on the selective movement of the type wheels. Relay 52 closes contact 52A and opens contact 52B; contact 52A starts the card feeding operation for the next card, at the beginning of the type positioning movement for the preceding card. On the deenergization of relay 52, contact 52B grounds contact 53A of relay 53, which remains energized a measured length of time after the release of relay 52, grounding conductor 53F, momentarily energizing the printing hammer magnets 107, 108, 109. When energized, relay 53 sets up the above described circuit, and also through contact 53B energizes slow-to-release relay 54; when deenergized, contact 53C grounds contact 54A, grounding conductors 54F, 79C, 56A, momentarily energizing clutch 76, for starting the advance of the paper, 80 (Fig. 5).

Relay 54 is also a slow-to-release relay. When energized, it sets up the above described circuit, and through contact 54B, conductor 54E, 54E (Fig. 2) holds energized through contacts as 46A and windings as 46E, relays as 46, until the printing of the record of the last ejected card is complete. When deenergized, contact 54C grounds conductor 54D, contacts 95A, and if a card is in the recording position, conductor 95B, 95B (Fig. 2), grounding bars 91, 92, 93, for the next registering operation.

Magnetic clutches 76 (Fig. 3) and 81 (Fig. 6) are diagrammatically illustrated in the drawings, clutch 76 controlling the advance of the paper and clutch 81 controlling the feed of the cards.

Cam 79 (Fig. 3) is provided for insuring a full movement of the paper feed and for preventing the reenergization of relays 52 and 53 on the zero-setting movement of the type wheels. Once energized, clutch 76 carries cam 79 forward, closing contact 79A during the passage of cam 79, continuing clutch 76 energized from this source until the zero position is reached. On this movement, contacts 79B open, preventing reenergization of relays 52 and 53 during the interval following the release of the type wheels from their old setting and prior to their movement toward the new setting. Preferably, the relay 54 is so timed in its release that the shaft 76B and cam 79 will have completed their cycle of rotation, and contacts 79B will have closed again, shortly prior to the time the type wheels have been rotated through one character space toward their new setting.

Cam 83, through contact 83B, serves a like purpose for the card feed mechanism; clutch 81 is initially energized through contacts 52A, conductor 52D, contact 55B, if relay 55 is unenergized, conductor 55E, contact 83A, and conductor 57B.

The test wheel 82 is for the purpose of preventing the reenergization of clutch 81 and the consequent premature ejection of a card; on the final movement of cam 82 contact 82A is momentarily grounded, energizing winding 55C of relay 55, and locking up through winding 55D, contact 55A, conductor 52D, and contact 52A, if relay 52 should become energized due to a faulty operation, as the slow return of a type wheel, which continues after the paper feed operation is complete. On the continued energization of relay 55, contact 55B is open, preventing energization of clutch 81.

Key 56 is for the purpose of starting the feed roll to position the paper for the first operation. Key 57 is for a like purpose for positioning the first card. Rocker arm 95 is for the purpose of rendering the registers inoperative when the supply of cards is exhausted.

Figure 4:
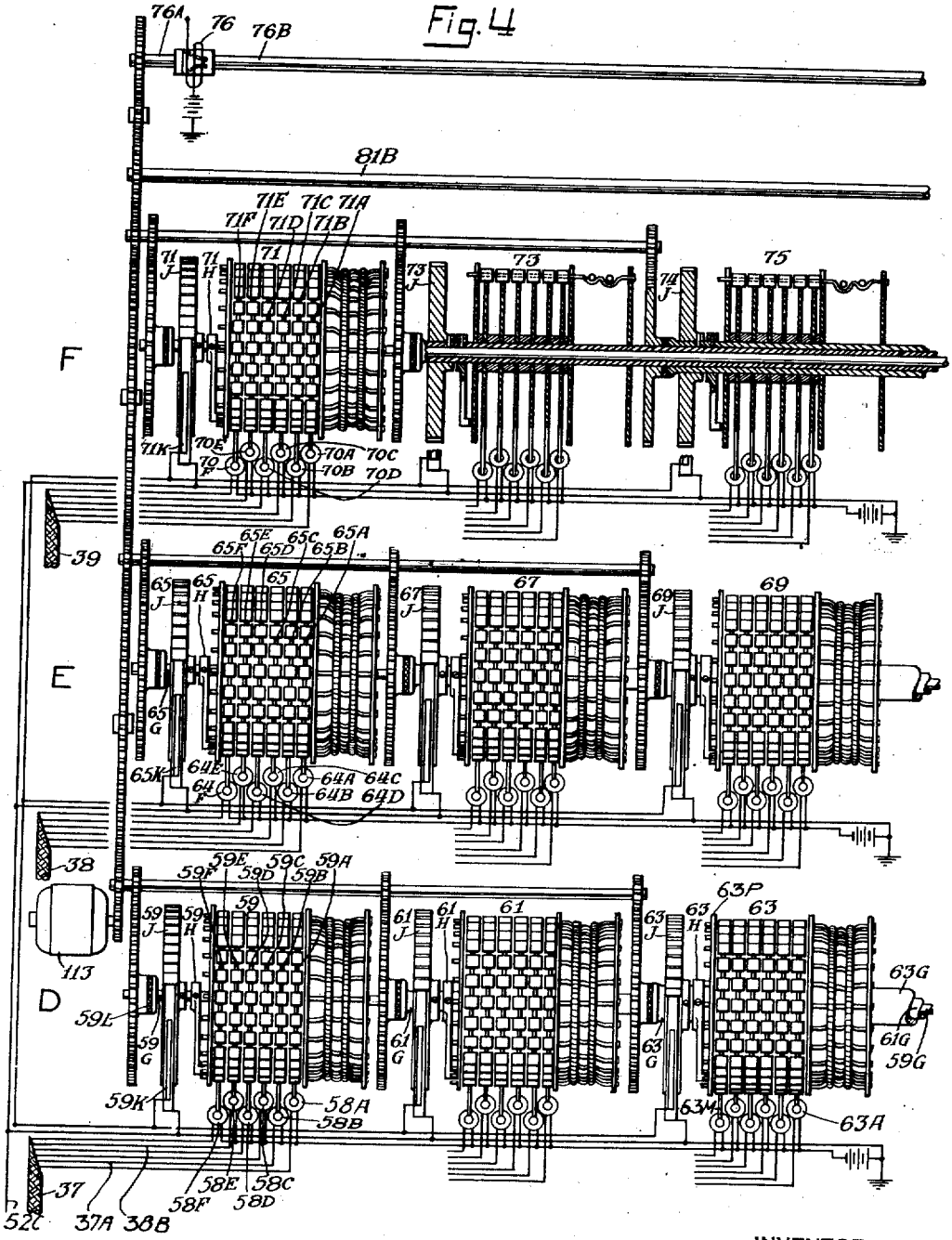

*Code discs. Figure 4*

In Figure 4 is shown a top plan view of nine sets of code discs, denoted generally by the characters 59, 61, 63; 65, 67, 69; 71, 73, 75, arranged in three rows of three sets each. They and their associated type wheels (Fig. 5) occupy corresponding positions in Figures 4 and 5. Each set, as 59, 61, 63, consists of six discs and associated member; and is for the purpose of selectively positioning the associated type wheel of Figure 5. There is one type wheel for each set of discs.

These discs are of a well known type. They are described in United States Patent 1,821,110.

Each set consists of six discs, as 59A, 59B, 59C, 59D, 59E, 59F, and their operating magnets, as 58A, and shaft, as 59G, to which is attached a stop-arm, as 59H, a toothed wheel, as 59J, which is also attached to shaft 59G, and contacts, as 59K, a pin guide plate, as 63P, and pins as 63X, as shown in Figure 9. The discs are loosely mounted on their respective shafts, and have conventional spacing collars. In practice, the guide plates and shafts would be provided with suitable mountings and bearings; for the sake of clearness, these are omitted from the drawings.

There is a stop-pin for each character that may be printed; the selected pin is set in the path of the stop-arm through the movement of the selected disc, or non-movement of the discs.

The code disc magnets, as 58A, of the several sets are selectively energized by the correspondingly positioned register relays of Figure 1, and actuate their code discs to position the selected stop-pin in the path of the stop-arm, as 59H, stopping the shaft, as 59G, against the drag of the friction clutch, as 59L, positioning the associated type wheel at the selected position as represented by the perforations in the card. The shafts of the several code disc units have a common driving means, motor 113, which through the several gears and clutches transmits motion to the shafts, as 59G, through a friction clutch, as 59L. The sets 73 and 75, are shown in section to illustrate more clearly a stop-pin of each set and the arrangement of the shafts, which are sleeved one on top of another.

The toothed wheels, as 59J, have a tooth for each character space, which closes and opens contacts as 59K on the movement of the wheel from one space to the next for a purpose described in relation to Figure 3.

*Type wheels, type hammers, paper feed. Figures 5, 5A, 5B*

Figure 5 is a view in perspective of three groups of type wheels of three wheels each, with part of the middle group in section, to show the arrangement of the shafts, sleeved one upon another, and the several type wheels. The paper feed and printing hammers are also shown.

The type wheels, as 110, are rigidly mounted on their respective shafts, as 59G, which are extended to the code disc units, as 59, which selectively position them by the stoppage of stop-arms, as 59H. They are for the purpose of setting up, one line of type at a time, on a group of type wheels, the records of the cards as they pass through the machine in operation. The several type wheels are illustrated in neutral position.

The paper, 80, is shown in a continuous piece, with feed roll 77 and idler 78 for advancing it on each printing operation. Cam wheel 79, and associated contacts, are for the purpose of advancing the paper a measured distance on each operation There is a type hammer, as 114A, for each type wheel, here shown in a draftsman's convention. Each hammer is riveted to the hammer bar, as 114, which is suitably pivoted at both ends. It is pulled downwardly by a magnet, as 107, and on release of such magnet it is pulled upwardly by spring 114B, causing the hammer to strike the ribbon, as 114C, the paper 80, and type wheel 110.

Figure 5A is an end view of a type wheel, 110, a section of paper, 80, ribbon, 114C, and hammer, 114A.

Figure 5B is an end view of feed and friction rolls, 77 and 78, paper, 80, and feed control cam, 79, with associated contacts, 79A and 79B.

*Card feed. Figures 6, 6A, 6B*

Figure 6 is a top plan view of a conventional card feed, and associated cams, all of which are driven from shaft 81A when coupled to shaft 81B by magnetic clutch 81. Clutch 81 is for the purpose of setting in motion the card feed and cams and advancing each card to the recording position and there stopping it until its record is taken up by the selected registers.

Cams 82 and 83 are here shown with contacts less wiring. Cam 82 is for the purpose of setting up a circuit to prevent the premature ejection of a card before the mechanism has completed the operation for the preceding card. Cam 83 is for the purpose of insuring a full movement of the card feed. They are shown in fragmentary end view in Figure 3, together with their complete circuits, and are there described.

Cams 86, 87, 88, are rigidly attached to shaft 85A. They are here shown without contacts or wiring. Each cam has three positions: they move in unison with the card feed, being geared to shaft 81A through gears 84 and 85 with a ratio of three to one. They are shown in end view in Figure 2, with their wiring and associated relays, and are described in connection with Fig. 2.

In Figures 6A and 6B are shown end view details of Figure 6.

*Cards. Figure 7*

This figure shows fragmentary views of three cards, 94, 102, 103, with their perforations for the examples of operation.

*Card feed. Figure 8*

The card feed is shown in end view, with gears as 100A removed to show the mechanism more clearly. The cards, 89, are stacked upon the platform, 90, with card 94 in position relative to contact bars 91, 92, 93, and fingers as 91B. The cards are fed one at a time, with a momentary pause in the position shown, whereupon the bars are momentarily grounded, setting up circuits through the perforations to the fingers for energizing the selected register relays.

The cards are fed one at a time by a reciprocating cross-head feed, 117, and feed rollers 118, 119, 120, 121; these rollers are rigidly attached to their respective shafts, 118A, 119A, 120A, 121A, as are their driving gears, 100 and 122.

Rocker arm 95 and contact 95A are for the purpose of stopping action of the registering elements when the cards are exhausted. It is shown with wiring and it is described in connection with Figure 3.

*Code discs. Figure 9*

Figure 9 is a fragmentary end view of a code disc, 63F, with a portion 63M, extended to form an armature. The armature is attracted to magnet 63A on a selective operation, rocking the code disc on the sleeve 63G, into operative position. On the deenergization of magnet 63A, spring 63N resets the code disc to its normal position. The stop-arm, 63H, is shown stopped by the pin, 63X, in a selective position.

*Code layout. Figure 10*

In Figure 10 is shown a conventional layout of the six-unit code which is assumed to be used in the equipment here illustrated.

DESCRIPTION OF OPERATION

*Feeding the first card, registering the perforations, and printing the first line of the first card*

The paper 80 is fed into the machine and positioned between feed roll 77 and pressure roll 78; the cards, 89, are placed in the feed box 90. Switch 57 (Fig. 3) is normally momentarily pressed, energizing through conductors 57A and 57B clutch 81; shaft 81A, gears 84, 85, 99, 100, wheels 82, 83, and cams 86, 87, 88, take motion; contact 83B closes, continuing clutch 81 energized for one revolution of shaft 81A.

Contact 82A is closed and opened by tooth 82B as wheel 82 approaches the completion of its revolution; this movement is ineffective on the first of a series of cards. Gear 99 sets in motion the card feeding mechanism, and positions card 94 as shown in Figure 8.

With the movement of shaft 85A, cams 86, 87, 88, make one-third of a revolution. They are now assumed to be in the position shown in Figure 2. During the movement of cam 87, contacts 87A, 87B, 87C, were closed, grounding conductors 87D, 87E, 87F, energizing relays 43, 44, 45, through windings as 43E. Contacts 88A and 86A are closed; contact 88A grounds conductor 88D, energizing through winding 46D relay 46; contact 86A grounds conductor 86D, energizing transfer relay 40; cam 87 opens contact 87C, freeing winding 45E from this source of energization.

Relay 43 is energized; contacts 46L, 46C, 46B, 46A, are closed and 46K open; contact 46L grounds conductors 46M and 87F, reenergizing winding 45E of relay 45; contact 46C grounds conductor 46G, energizing shift relay 7; contact 46B grounds conductor 46F and contact 43A; winding 43F energizes and remains energized so long as contact 46B remains closed. Contact 46A sets up a holding circuit for relay 46, to hold it energized until the type wheels are positioned for printing the record of the first card. Contact 46K frees conductor 46N and contacts 47L and 47 C from ground, so long as relay 46 is energized.

Relays 43, 44, 45, energizing, ground contacts as 43B, 43C, 43D, contacts 43D, 44D, 45D, grounding conductors 43G, 44G, 45G, and contacts as 2C, for locking up through windings as 2B relays as 2, of the three rows of register relays. The card 94 is now positioned as shown in Figure 8; it engages rocker arm 95, closing contacts 95A. Relay 54 (Fig. 3) is deenergized, contact 54C grounds conductor 54D; contacts 95A are closed, grounding conductor 95B, 95B (Fig. 2), grounding bars 91, 92, 93.

The card 94 (Fig. 7) is perforated for A, B, and C, each of which letters in this specification represents a line of the address. Through perforations 94A and 94B for A, representing the first line, brushes 91A and 91B are grounded; for B, the second line, perforations 94C, 94D, 94E, and brushes 92C, 92D, 92E; and for C, the third line perforations 94F, 94G, 94H, and brushes 93F, 93G, 93H, effect like circuits. The several brushes ground like-lettered contacts with the figures 40, of the relay 40. This relay is now energized, transferring the record of the perforations to the register relays; relays 2 and 5 for A; 16, 17, 18, for B; and 19, 20, 21, for C; energizing through windings as 2A, and locking up through contacts as 2C windings as 2B, and conductors 43G for the first row, 44G for the second, and 45G for the third.

Shift relay 7 is energized, contact 7A is grounded, grounding conductor 7X, which grounds contacts 2D, 5D, 7F, 7C, and through cable 37, 37 (Fig. 4) conductors 37A and 37B are grounded energizing magnets 58B and 58E, positioning discs 59B and 59E, and releasing the stop-pin for the letter A. Shaft 59G, toothed wheel 59J, and stop-arm 59H, take motion from friction clutch 59L. Type wheel 110 is driven forward to the letter A; the selected stop-pin which has been set in the path of stop-arm 59H, stops further movement, with the letter A in position for printing.

On the movement of toothed wheel 59J from one tooth to the next, contact 59K is momentarily closed, grounding conductor 52C, contact 79B, conductor 52E, energizing relays 52 and 53 (Fig. 3). Relay 52 closes contact 52A, and opens contact 52B; contact 52A grounds conductor 52D, contacts 55B, conductor 55E, contact 83A, and conductor 57B, energizing clutch 81, and setting in motion the card-feeding mechanism, as before described, to eject card 94 and replace it with card 102 (Fig. 7). Relay 53 closes contacts 53A and 53B, and opens contact 53C. Contacts 53A and 53C are not now effective. Contact 53B grounds conductor 53D, energizing relay 54, which closes contacts 54A and 54B, and opens contact 54C.

On the movement of wheel 82, tooth 82B momentarily closes contact 82A, energizing winding 55C, opening contact 55B and closing contact 55A; this is without effect, as it is assumed that the type wheel 110 has reached its selected position, and on this stoppage of wheel 59J relays 52 and 53 are released. Wheel 83 reached its zero position, opening contact 83B, deenergizing clutch 81, stopping motion of the card feed.

Relay 52 deenergized on the stoppage of wheel 59J, freeing contact 52A from ground. Contact 52B is grounded, grounding contact 53A, conductor 53F, energizing printing magnets 107, 108, 109, which attract their armatures against the tension of springs as 114B, positioning hammers, as 114A, for a printing operation. Relay 53 releases opening contacts 53A and 53B, and closing contact 53C. Contact 53A frees magnets 107, 108, 109, from energization, releasing their several armatures, effecting a printing operation. Contact 53B frees relay 54 from energization. Contact 53C grounds contact 54A, conductors 54F, 79C, and 56A, energizing clutch 76. Shaft 76B, feed roll 77, and cam 79, take motion; cam 79 closes contact 79A, continuing clutch 76 energized for one revolution of feed roll 77 and cam 79; when cam 79 completes its revolution, contact 79A, opens, clutch 76 deenergizes. The paper, 80, is advanced one position.

*Registering perforations of the second card and printing the second line of the first card and the first line of the second card*

During the movement of feed roll 77 and cam 79, relay 54 deenergizes, opening contacts 54A and 54B. Contact 54A frees conductor 54F from ground, preventing reenergization of clutch 76; contact 54B frees conductor 54E, 54E (Fig. 2), contact 46A, and winding 46E of relay 46, from energization, with the effect to be later described.

On the ejection of card 94 and the positioning of card 102, cams 86, 87, 88, advancing one step; cam 86 opened contact 86A, releasing transfer relay 40; contact 86B closed, grounding conductor 86E, energizing transfer relay 41. Cam 87 closed contact 87C and opened contact 87A; contact 87C continues winding 45E of relay 45 energized; contact 87A frees winding 43E of energization, though not releasing it. Cam 88 opened contact 88A and closed contact 88B; contact 88A frees winding 46D of energization, though not releasing it; contact 88B grounds conductor 88E, energizing winding 47D of relay 47, closing contacts 47L, 47C, 47B, 47A, and opening contact 47K. Contacts 47L and 47C are ineffective until relay 46 deenergizes and closes contact 46K.

On the stopping of the type wheel at the selected position, relay 54 (Fig. 3) deenergized, closing contact 54C and opening contact 54B; contact 54B frees conductor 54E, 54E (Fig. 2) and contact 46A from ground, releasing relay 46, opening contacts 46L, 46C, 46B, 46A, and closing contact 46K; contact 46L frees conductor 46M from ground, placing relay 45 under control of contact 87C; contact 46C frees conductor 46G from ground, releasing shift relay 7; contact 46B frees contact 43A from ground, releasing relay 43; contact 46K grounds conductor 46N and contacts 47L and 47C.

Relay 43 deenergizing opened contacts 43D, 43C, 43B, 43A. Contact 43D frees conductor 43G, releasing relays 2 and 5 for the letter A for the first card. On release of relay 46, contact 46K closes a measured length of time after contact 46B opens; contact 46K grounds conductor 46N and contacts 47L and 47C. Relay 47 is energized; contacts 47L and 47C are now grounded; contact 47L grounds conductors 47M and 87D, reenergizing winding 43E of relay 43, closing its several contacts. Contact 47C grounds conductor 47G, energizing shift relay 8; contact 47B grounds contact 44A, energizing winding 44F of relay 44; contact 47A sets up through winding 47E and conductor 54E a holding circuit for relay 47.

Relays 43, 44, 45 are energized, closing their several contacts. Contact 43C grounds conductor 43H, setting up a holding circuit for the third line (letter A) of the second card. Contact 44C grounds conductor 44H for the first line (letter B), and contact 45C for the second line (letter C). Contacts 44D and 45D continue to hold energized the relays for the second and third lines of the first card. Relay 54 deenergizing grounded contacts 54C, conductor 54D, contacts 95A, conductor 95B, 95B (Fig. 2), grounding bars 91, 92, 93.

Card 102 (Fig. 7) is now in place. It is perforated at 102A, 102B, 102C, for B; at 102D, 102E, 102F, for C; at 102G, 102H, for A. Through correspondingly positioned brushes and correspondingly lettered contacts, preceded by the figures 41, of the transfer relay 41, relays 50, 22, 23, for B, 24, 25, 26, for C, and 27 and 28 for A, are energized, and lock up through their several contacts and windings as before described and conductors 44H, 45H, 43H, and contacts 44C, 45C, 43C.

Relay 47 is energized, grounding contact 47C, conductor 47G, energizing shift relay 8 for the second line (letter B) of the first card; contact 47C, conductors 47G, 47X, 47H, energizing shift relay 10 for the first line (letter B) of the second card.

On the energization of shift relays 8 and 10, the records of the register relays 16, 17, 18, for the second line of the first card, and of relays 50, 22, 23, for the first line of the second card, are transferred through correspondingly positioned contacts, and cables 38 and 37, 38 and 37 (Fig. 4) to correspondingly positioned magnets, 64B, 64D, 64E, for the second line of the first card, and 58A, 58C, 58E, for the first line of the second.

Shafts 59G and 65G, toothed wheels 59J and 65J, and type wheels 110 and 111, take motion; relays 52, 53, 54, are energized with the effect before described. The type wheels are stopped at the two B positions; contact 52A sets up the before-described circuit to eject card 102 and to feed card 103; relay 52 releases and effects the printing operation as before described.

*Feeding the third card and printing the third line of the first card, the second line of the second card, and the first line of the third card*

On the movement of wheels 59J and 65J (Fig. 3), relay 52, 53, 54 are again energized, setting up circuits as before described to feed the third card, 103 (Fig. 7), and to advance cams 86, 87, 88 to their third position. Relays 52 and 53 release; contact 53C closes, grounding contact 54A, conductors 54F, 79C, and 56A, energizing clutch 76, advancing the paper 80 one step to the third position. Contact 54B is also closed, grounding conductor 54E, 54E (Fig. 3), and contact 47A, holding relay 47 energized.

Cams 86, 87, 88, reach their third position; relay 54 releases, freeing contact 54B and conductor 54E, 54E (Fig. 2) from ground, releasing through contact 47A relay 47, opening contacts 47L, 47C, 47B, 47A, and closing contact 47K. Contact 47L frees conductor 47M from ground, placing relay 43 under control of contact 87A. Contact 47C frees conductors 47G, 47X, 47H, from ground, releasing shift relays 8 and 10. Contact 47B frees contact 44A from ground, releasing relay 44. Relay 44 deenergizing opens contacts 44D, 44C, 44B, 44A. Contacts 44D and 44C free conductors 44G and 44H from ground, releasing register relays 16, 17, 18, for the second line of the first card, in the first register, and 50, 22, 23, for the first line of the second card, in the second register.

On release of relay 47, contact 47K closes a measured length of time after contact 47B opens. Contact 47K grounds contacts 48L and 48C; relay 48 is energized; contacts 48L and 48C are now grounded; contact 48L grounds conductors 48M and 87E, reenergizing winding 44E of relay 44, closing its several contacts. Contact 48C grounds conductor 48G, energizing shift relay 9, for the third line of the first card, also conductors 48X and 48H, energizing shift relay 11 for the second line of the second card, and conductors 48G, 48X, 48XX, and 48J, energizing shift relay 13 for the first line of the third card.

Card 103 is in position, relay 54 is deenergized, grounding bars 91, 92, 93, setting up circuits through perforations 103A, 103B, 103C, for its first line (letter C), 103D, 103E, 103F, for its second line (letter B), and 103G and 103H for its third line (letter A). The record of the card is transferred to correspondingly positioned brushes and correspondingly lettered contacts, preceded by the figures 42, of the transfer relay 42, energizing register relays 29, 30, 31, for the first line, 32, 33, 34, for the second, and 35 and 36 for the third. The record of the third line (letter C) of the first card is transferred through cable 39, 39 (Fig. 4) to code disc magnets 70B and 70E, the record of the second line (letter C) of the second card, to magnets 64B, 64D, 64E, and the record of the first line of the third card (letter C) to magnets 58B, 58D, 58E.

The type wheels 110, 111, 112, are positioned for their respective letters, and the printing operations for the three proceed simultaneously, as before described.

The third card is replaced by the fourth. Circuits are set up as before described to energize the register relays of the A group and to print the first line of the fourth address, while the middle line of the third and the last line of the second are likewise set up and printed. In energizing the register relays for the fourth and succeeding cards, it may happen that certain of the register relays for the third line of, say, the first card will still remain energized after the intelligence from the fourth card has been transferred to the register relays in that group. This will only be momentary, however, for the subsequent release of a control relay as 45, following the opening of a contact as 48B of a relay as 48 and prior to the closure of a contact as 48K, will momentarily interrupt the holding circuit as 45G for the register relays corresponding to the third line of the address, and the unwanted register relays, i. e., those used in conjunction with the first card but not with the fourth card, will be released; while those register relays in the third line which are to remain energized will be grounded through card perforations and will not be released during the short interval in which the holding circuit as 45G is interrupted.

*Operation with unduly long or retarded movement of type wheels*

At the beginning of each printing movement, and continuing so long as any of the several type wheels are in selective motion, toothed wheels as 59J close and open contacts as 59K, energizing relays 52, 53, 54; contact 52A, through the circuits before described, starts the card feeding mechanism to position the next card. In the event any wheel, as 59J, continues in motion after the card is positioned, action on it will be withheld, due to contact 54C being open, and withholding ground from bars 91, 92, 93 (Fig. 2).

The continued energization of relay 54, also continues contact 54B, conductor 54E, 54E (Fig. 2) grounded, holding relay 46 energized, assuming the card to be the first, fourth, seventh, or a corresponding place in the series. With relay 46 energized, contact 46K continues open, withholding ground from contacts 47L and 47C, with the effect as before described.

To prevent the ejection of the second card, due to the continued energization of relay 52, without registering its record, relay 55 is momentarily energized by tooth 82B and contacts 82A, as the second card nears its position; if relay 52 continues energized, contact 52A continues grounded, grounding conductor 52D, contact 55A, energizing winding 55D, holding contact 55B open, and preventing energization of clutch 81 so long as relay 53 remains energized.

After the last card has been ejected from the machine and the last line has been printed under control of the register relay group wherein the intelligence derived from this card was stored, the type wheels will commence their return to normal position, and will continue uninterruptedly in such movement. Contact 95A, Fig. 3, will be open at this time, since no card is in sensing position, and will prevent ground from being applied to the code magnets through the sensing bars and brushes. It may happen that the contacts 79B on the cam 79, Fig. 3, will close before all the type wheels have been restored to normal position. In this event the relays 52, 53 and 54 will reenergize. This will cause the clutch 81 to energize and send the shaft 81A through an extra cycle. Likewise, when the type wheels are all restored to normal, the deenergization of the relays 52, 53 and 54 will cause the clutch 76 to send the shaft 76B through an extra cycle. Such extra cycles, however, do not result in any misoperation of the machine, since the card contacts 95A are maintained open at this time and no further energization of the code magnets can take place. It is only essential that the cam contacts 79B remain open during the interval between successive settings of the code magnets. Their closure during the zero-setting operation, after the last address has been printed, is of no consequence.

I claim:

1. In an automatic addressing machine, a plurality of rows of start stop printing wheels, each row sufficient to serve one entire line of an address at one time, a code disc stop-arm selector for each said printing wheel, transfer means for transferring to said selectors at one time all of the codes representing the intelligence of all lines to be printed at one time, and means to operate all of said rows of wheels to print at one time.

2. In an automatic addressing machine, a plurality of rows of printing wheels, each row of printing wheels sufficient to serve one entire line of the address at one time, a selector for each said printing wheel, and a set of sleeved shafts connecting said selectors to said printing wheels individually, means to adjust all the wheels of a line simultaneously and means to print said lines line by line successively.

3. A line-by-line printer, comprising a plurality of type wheels arranged in axial alinement with each other, a plurality of code disc stop-arm selectors arranged in axial alinement with said type wheels, co-axial tubular shafting connecting each stop-arm to its corresponding type wheel, means for adjusting said selectors according to code, and means for printing.

4. A line-by-line printer, comprising, a plurality of lines of type wheels, a plurality of code disc selectors, one for each said type wheel, a plurality of code-registers, one for each selector, means for setting simultaneously all of said registers to register character codes, means for transferring line by line said character codes to said selectors, said selectors controlling said type wheels severally to present for printing the several characters represented by said character codes respectively, and means for printing.

5. A line-by-line printer, comprising, a plurality of type wheels, each of narrow lineal dimension and arranged side by side to form a line, a plurality of code discs and rotary stop-arm selectors, one for each type wheel, in each of which the smallest outside dimension is greater than the lineal dimension of its associated type wheel, mechanical articulation in each said selector connecting said stop-arm and said type wheel for related movement, said type wheels being more closely spaced than said selectors.

6. In an addressing machine, controlled by a sensing record, a plurality of type wheels arranged to print simultaneously in lines, motor means to rotate said type wheels simultaneously and independently, selectors, one for each of said type wheels, adapted to stop said type wheels in selective positions according to code, sensing contacts and storage means settable simultaneously for a plurality of lines and controlling said selectors line by line and means for printing line by line.

7. A multiple line-by-line address printer for printing a plurality of lines simultaneously, comprising, a plurality of type wheels arranged in sets, a set of said type wheels for each line of simultaneous printing, a plurality of code-controlled selectors, one for each type wheel, each selector controlling its associated type wheel to present for printing a type corresponding to a code set upon the selector, a plurality of registers, one for each selector, means for setting said registers in groups, each group making registration of a unitary address and sets of registers in the group pertaining to consecutive lines in the address, means for transferring the registration of successive lines to said selectors to adjust type wheels in successive sets, and means for line-by-line printing said address line by line.

8. A multiple line-by-line address printer for printing a plurality of lines simultaneously, comprising, a plurality of type wheels arranged in sets, a set of type wheels for each line of simultaneous printing, a plurality of code-controlled selectors, one for each type wheel, each selector controlling its associated type wheel to present for printing a type corresponding to a code set upon the selector, a plurality of registers, one for each selector, means for setting said registers in groups, each group making registration of a unitary address and sets of registers in the group pertaining to consecutive lines in the address, means for transferring the registration of successive lines to said selectors to adjust type wheels in successive sets, means for line-by-line printing said address line by line, and overlap means whereby a line each from a plurality of addresses are printed simultaneously.

9. In an addressing machine, a plurality of printing mechanisms comprising type wheels each having settable types, said printing mechanisms being each adapted to print one line of an address, means for moving a paper from printing mechanism to printing mechanism, means for printing upon said paper a plurality of lines of the address, successively, one line by each of said printing mechanisms, code selectors for selectively setting the type wheels of said printing mechanisms, and means in each said printing mechanism to reset said type wheels between successive printings.

10. In an addressing machine, a plurality of printing mechanisms comprising type wheels each having settable types, said printing mechanisms being each adapted to print one line of an address, means for operating said mechanisms successively, code disc selectors for selectively setting the type wheel of said printing mechanisms, means in each said printing mechanism to reset said type wheels between successive printings, and means for moving a receiving paper between successive printings.

11. In an addressing machine, a plurality of printing mechanisms comprising type wheels each having settable types, said printing mechanisms being each adapted to print a line of an address, means for operating said mechanisms successively to print upon a receiving paper, code disc selectors for selectively setting the type wheels of said printing mechanisms, means in each said printing mechanism to reset said type wheels between successive printings, and means for moving the receiving paper between successive printings through a distance other than the distance between printing mechanisms so that the spacing apart of the printings on the paper will be different from the spacing apart of said printing mechanisms.

12. In a card controlled addressing machine, printing means adapted to print a complete line at one printing impression, code disc selectors for setting up said printing means, a plurality of sets of storage relays, sensing means for searching a card and for setting all relays to register in code manner in response to any records found in said card, and sequence means for using a portion only of the stored registrations of said sets of storage relays to control said printing means through said code disc selectors.

13. In a card controlled addressing machine, a printing mechanism, code disc selectors for setting up said printing mechanisms, a storage set of relays comprising a feeding relay, a plurality of groups of storage relays and a plurality of delivery relays; means including said feeding relay for electrifying in code manner all of said storage relays under control of a card, and means including said delivery relays for controlling said printing mechanism by group after group of said storage relays successively through said code disc selectors.

14. In a card controlled addressing machine, a printing mechanism, code disc selectors for setting up said printing mechanism, a storage set of relays comprising a feeding relay, a plurality of groups of storage relays, and a plurality of delivery relays; means including said feeding relay for electrifying in code manner all of said storage relays in accordance with a control card, means including said delivery relays for controlling said printing mechanism by group after group of said storage relays successively through said code disc selectors, and a sequence system of contacts for controlling the sequential actions of said relays.

15. In a card controlled addressing machine, a series of printing mechanisms, code disc selectors for setting up said printing mechanisms, a plurality of storage sets of relays comprising feeding relays, groups of storage relays, and a plurality of delivery relays; means including said feeding relays for electrifying in code manner a plurality of groups of said storage relays, variant groups successively by control of successive cards, and means including said delivery relays for controlling independently said printing mechanisms through said code disc selectors.

16. In a card controlled addressing machine, a series of printing mechanisms, code disc selectors for setting up said printing mechanisms, a plurality of storage sets of relays comprising feeding relays, groups of storage relays, and a plurality of delivery relays; means including said feeding relays for electrifying in code manner a plurality of groups of said storage relays, variant groups successively by control of successive cards, means including said delivery relays for controlling independently and simultaneously said printing mechanisms through said code disc selectors, paper shifting means, and cam controlled contacts operable in sequential relation for controlling the operation and cooperation of said relays, said printing mechanisms and said paper shift means whereby a plurality of lines of an address are read simultaneously from a card and stored and a variant plurality of lines of addresses are delivered simultaneously to said printing mechanisms for printing upon various papers being simultaneously addressed.

17. In an addressing machine, a plurality of printing wheels, a printing platen adapted to print from all of said wheels simultaneously controlling selectors for said wheels, one for each said wheel, and adapted to adjust said wheels simultaneously and independently to stop in printing positions respectively, and a detector circuit operative to prevent printing while any printing wheel is moving.

18. In an addressing machine, a plurality of start-stop printing members, common imprinting means, and electrical detector means to disable said imprinting means until all said printing members have stopped.

19. In an addressing machine, a plurality of start-stop printing members, common imprinting means, and detector means to restrain said imprinting means until all said printing members are at rest.

20. In an addressing machine, a plurality of start-stop printing members, common imprinting means, and electrical detector means energizable under control of a moving printing member to delay the operation of said imprinting means.

21. In an automatic addressing machine, a plurality of rows of printing members each row sufficient to serve one entire line of an address at one time, a code disc stop arm selector for each said printing member, transfer means for transferring to said selectors concurrently all of the codes representing the intelligence of all lines to be printed at one time, and means to operate all of said rows of printing members to print at one time.

22. In an automatic addressing machine, a plurality of rows of printing members, each row comprising printing members sufficient to serve one entire line of the address at one time, a selector for each said printing members, and a set of mechanical connectors connecting said selectors to said printing members individually, means to adjust all of the printing members of a line concurrently, and means to print said lines, line by line concurrently.

23. A line by line printer comprising, a plurality of type members arranged in axial alinement with each other, a plurality of code disc stop arm selectors corresponding severally to said type members, mechanical linkage connecting each stop arm to its corresponding type member, means for sensing a transcribable code from a record card or the like, means for adjusting said selectors according to the sensed code, and means for printing from said type members line by line.

24. A line by line printer comprising, a plurality of lines of type members, a plurality of code disc selectors one for each of said type members, a plurality of code registers one for each selector, means for setting concurrently all of said registers to register character codes, means for transferring line by line said character codes to said selectors, said selectors controlling said type members severally to present for printing the several characters represented by said character codes respectively, and means for printing the presented characters.

25. A line by line printer comprising, a plurality of type members each of narrow lineal dimension and arranged side by side to form a line, a plurality of code disc rotary stop arm selectors one for each said type member in each of which the smallest outside dimension is greater than the lineal dimension of its associated type member, mechanical articulation in each of said selectors connecting said stop arm and said type member for related movement, said type members being more closely spaced than said selectors.

26. In an addressing machine controlled by a sensing record, a plurality of type carriers arranged to print in lines, motor means to drive said type carriers into selective printing positions concurrently and independently, selectors one for each of said type carriers and adapted to stop said type carriers in selective positions according to code, code storage means settable concurrently and controlling said selectors line by line, and means for printing line by line from said individual types.

27. A multiple line by line address printer for printing a plurality of lines of variant addresses simultaneously, comprising, a set of type members for each line of concurrent printing, a plurality of code controlled selectors one for each type member, each selector controlling its associated type member to present for printing a type corresponding to a code set upon the selector, a plurality of registers one for each said selector, means for setting said registers in groups each group making registration of a unitary address and sets of registers in the group pertaining to successive lines in the address, means for transferring the registration of successive sets, and line by line printing means for printing said addresses concurrently line by line.

28. In an addressing machine, a plurality of printing members, a printing means adapted to print from all of said members concurrently, controlling selectors one for each said member and adapted to move said members concurrently and independently to stop in printing positions respectively, and detector means adapted to prevent printing while any printing member is moving.

29. In an addressing machine, a plurality of start-stop printing members, common imprinting means, and electrical detector means energizable under control of a printing member while moving to delay the operation of said imprinting means.

30. In a printing machine, the combination of registers settable concurrently from selectable contacts in corresponding groups, printing elements, code disc stop arm selectors controllable respectively by said registers to set up said printing elements, and means for successively actuating successive groups of said selectors to set up said printing elements to print successively a plurality of lines according to the respective register settings.

31. In a printing machine the combination of a series of groups of registers, means for setting the registers of a group from respective selectable contacts, means for so setting the series of registered groups successively, a plurality of printing elements, a plurality of code disc stop arm selectors, one for each printing element, and means for concurrently actuating the several selectors to set up the printing elements each according to a register setting.

32. In a printing machine, the combination of a group of registers each including locking relays settable from contacts representing respective lines of type, a printing element including a code disc stop arm selector and printing means, and means for actuating said selector to control successive printings according to the relays set for each type line.

33. In a printing machine, the combination of a series of registers, a series of code contacts, one for each register in any one series and settable according to codes for type characters, means for setting the several series of registers in rotation according to successive selections of said contacts, printing type elements, code disc stop arm selectors for positioning said type elements and controllable in common by the several series of registers successively, and means for repeatedly actuating said selectors according to successive register settings.

34. In a printing machine, registering means controlled by a card for registering representations of a large number of characters, printing means, and code disc stop arm selectors under control of the registering means for automatically setting up the printing means to simultaneously print a smaller number of characters than the characters registered in said registering means.

35. In a printing machine controllable from a sensing record, the combination of record sensing contacts, registers arranged in a plurality of groups and all settable concurrently by the control of said record sensing contacts, printing means, code disc stop arm selectors controllable by said registers for setting up said printing means, and means for successively actuating said selectors under control of successive groups of said registers to actuate said printing means to print successive lines represented by the records sensed by said contacts.

36. In a printing machine controllable from a sensing record, the combination of record sensing means, registers settable concurrently by said record sensing means, printing means, code disc stop arm selectors settable under control of said registers to set up said printing means, means for independently and successively actuating said selectors to set up said printing means under control of said registers, and means for successively operating said printing means to make an impression therefrom after set up thereof.

37. In a printing machine controlled by records each of which contains codes for a plurality of lines, storage means for the codes, printing means, code disc stop arm selectors for positioning said printing means, sensing means for transferring codes from said records to said storage means record by record, and transfer means for transferring codes from said storage means to said selectors line by line to thereby set up said printing means for printing line by line.

38. In a card controlled printing machine, a plurality of code registers, code contacts closable through perforations in a control card, means for closing circuits including said contacts and representing only codes for characters closable through perforations in said control card to operate said registers, a plurality of printing means, a plurality of code disc stop arm selectors, one for each printing means, and means for successively actuating said selectors under control of said registers one at a time to thereby set up said printing means one at a time.

39. In a record card controlled printing machine, storage means, means for sensing a card and entering at least a part of the record thereon in said storage means, printing means, code disc stop arm selector means, and means for actuating said selector means according to a record entered in said storage means whereby said printing means may be set up to print according to the record entered in said storage means.

40. In a printing machine, means for simultaneously sensing a plurality of lines of a record, a printing means for each line, code disc stop arm selector means for each printing means, and means for successively actuating said selector means to successively set up the printing means to successively print the sensed lines.

41. In an addressing machine controlled by cards or the like bearing records consisting of a plurality of lines of printing, storage means, means for sensing a card or the like and simultaneously entering the record of an address in the storage means, printing means for separately printing the lines of an address, code disc selector means for setting up said printing means, and means for successively actuating the selector means from said storage means to successively print the lines of the address.

42. In a printing machine for simultaneously sensing a plurality of lines of a record on a card or the like, a register, means for transferring the sensed lines of the record into the register, printing means for separately printing the sensed lines, code disc selector means for setting up the printing means and means for transferring the sensed lines to the selector means line by line to thereby set up the printing means line by line.

CLYDE SMITH.